US010232260B2

(12) United States Patent
Hosoyamada et al.

(10) Patent No.: US 10,232,260 B2
(45) Date of Patent: Mar. 19, 2019

(54) INFORMATION PROCESSING APPARATUS, INFORMATION PROCESSING SYSTEM, AND PROGRAM

(71) Applicant: KABUSHIKI KAISHA SEGA Games, Tokyo (JP)

(72) Inventors: Mizuki Hosoyamada, Tokyo (JP); Koji Shindo, Tokyo (JP)

(73) Assignee: Kabushiki Kaisha Sega Games, Tokyo (JP)

( * ) Notice: Subject to any disclaimer, the term of this patent is extended or adjusted under 35 U.S.C. 154(b) by 78 days.

(21) Appl. No.: 15/108,058

(22) PCT Filed: Oct. 3, 2014

(86) PCT No.: PCT/JP2014/076612
§ 371 (c)(1),
(2) Date: Jun. 24, 2016

(87) PCT Pub. No.: WO2015/098227
PCT Pub. Date: Jul. 2, 2015

(65) Prior Publication Data
US 2016/0325181 A1 Nov. 10, 2016

(30) Foreign Application Priority Data

Dec. 27, 2013 (JP) ................................ 2013-272684

(51) Int. Cl.
*A63F 13/497* (2014.01)
*A63F 13/20* (2014.01)
(Continued)

(52) U.S. Cl.
CPC ............ *A63F 13/497* (2014.09); *A63F 13/20* (2014.09); *A63F 13/25* (2014.09); *A63F 13/35* (2014.09);
(Continued)

(58) Field of Classification Search
CPC ........ A63F 13/497; A63F 13/20; A63F 13/25; A63F 13/35; A63F 13/355; A63F 13/48;
(Continued)

(56) References Cited

U.S. PATENT DOCUMENTS

2009/0092374 A1* 4/2009 Kulas ..................... H04N 7/173
386/248
2009/0094520 A1* 4/2009 Kulas ................ G06F 17/30056
715/723
(Continued)

FOREIGN PATENT DOCUMENTS

JP 2009-247563 10/2009

OTHER PUBLICATIONS

International Search Report issued by the Japanese Patent Office in International Application No. PCT/JP2014/076612, dated Jan. 13, 2015.

*Primary Examiner* — David L Lewis
*Assistant Examiner* — Shauna-Kay Hall
(74) *Attorney, Agent, or Firm* — Finnegan, Henderson, Farabow, Garrett & Dunner, L.L.P.

(57) ABSTRACT

Retrieval performance when selecting a game playing video can be improved. An information processing apparatus {12(*n*)} includes: a storage section (66) in which at least one tag and a tagging condition of the tag are stored in association with each other; and an attaching section (74) which, when playback data to be used to play back a game playing video of a game has been generated and an event during the play of the game satisfies the tagging condition, attaches the tag, which is associated with the tagging condition, to the playback data as an index of the game playing video.

6 Claims, 10 Drawing Sheets

(51) Int. Cl.
*A63F 13/25* (2014.01)
*A63F 13/35* (2014.01)
*A63F 13/355* (2014.01)
*A63F 13/48* (2014.01)
*A63F 13/32* (2014.01)
*A63F 13/332* (2014.01)
*A63F 13/335* (2014.01)
*A63F 13/323* (2014.01)

(52) U.S. Cl.
CPC ............ *A63F 13/355* (2014.09); *A63F 13/48* (2014.09); *A63F 13/32* (2014.09); *A63F 13/323* (2014.09); *A63F 13/332* (2014.09); *A63F 13/335* (2014.09); *A63F 2300/203* (2013.01); *A63F 2300/206* (2013.01); *A63F 2300/554* (2013.01)

(58) Field of Classification Search
CPC ...... A63F 13/32; A63F 13/323; A63F 13/332; A63F 13/335
USPC .......................................................... 463/40
See application file for complete search history.

(56) References Cited

U.S. PATENT DOCUMENTS

| | | | | |
|---|---|---|---|---|
| 2009/0208181 A1* | 8/2009 | Cottrell | ................ | G11B 27/034 386/278 |
| 2012/0100910 A1* | 4/2012 | Eichorn | ........... | H04N 21/43615 463/31 |
| 2014/0187318 A1* | 7/2014 | Gallizzi | ................ | A63F 13/355 463/31 |

* cited by examiner

INFORMATION PROCESSING APPARATUS, INFORMATION PROCESSING SYSTEM, AND PROGRAM

TECHNICAL FIELD

The present invention relates to an information processing apparatus, an information processing system, and a program.

BACKGROUND ART

For example, Patent Document 1 discloses a system that, in order to facilitate selection of a desired game playing video from a plurality of game playing videos which recreate previously played games, extracts a thumbnail image which indicates an appropriate scene in each game playing video, associates the extracted thumbnail images with the game playing videos, and registers the associated thumbnail images in a video data library.

CITATION LIST

Patent Document

Patent Document 1: Patent Publication JP-A-2009-247563

SUMMARY

Technical Problem

However, with the technique described in Patent Document 1, since a scene shown in a thumbnail image is simply an extraction of a single frame of a game playing video, there are cases where characteristics of a game playing video cannot be sufficiently expressed by a thumbnail image such as when a game has a characteristic flow, when contents of a game are complex, or when contents of a game are unique. In such cases, there is a risk of inhibiting retrieval performance when selecting a game playing video.

In consideration thereof, an object of the present invention is to provide an information processing apparatus, an information processing system, and a program which improve retrieval performance when selecting a game playing video.

Solution to Problem

An information processing apparatus according to the present invention includes: a storage section in which at least one tag and a tagging condition of the tag are stored in association with each other; and an attaching section which, when playback data to be used to play back a game playing video of a game has been generated and an event during the play of the game satisfies the tagging condition, attaches the tag, which is associated with the tagging condition, to the playback data as an index of the game playing video.

Advantageous Effects of Invention

According to the present invention, retrieval performance when selecting a game playing video can be improved.

DESCRIPTION OF EMBODIMENTS

Hereinafter, a plurality of embodiments of the present invention will be described with reference to the drawings. However, it is to be understood that the embodiments described below are merely exemplary and are not intended to exclude applications of various modifications and techniques not explicitly presented below. In other words, various modifications (such as combining the embodiments) of the present invention can be implemented without departing from the scope of the invention. In addition, in the following description of the drawings, same or similar portions are denoted using same or similar reference signs. The drawings are schematic and are not necessarily consistent with actual dimensions, ratios, and the like. The drawings may include portions with dimensional relationships and ratios that mutually differ among the drawings.

First Embodiment

Figure 1:
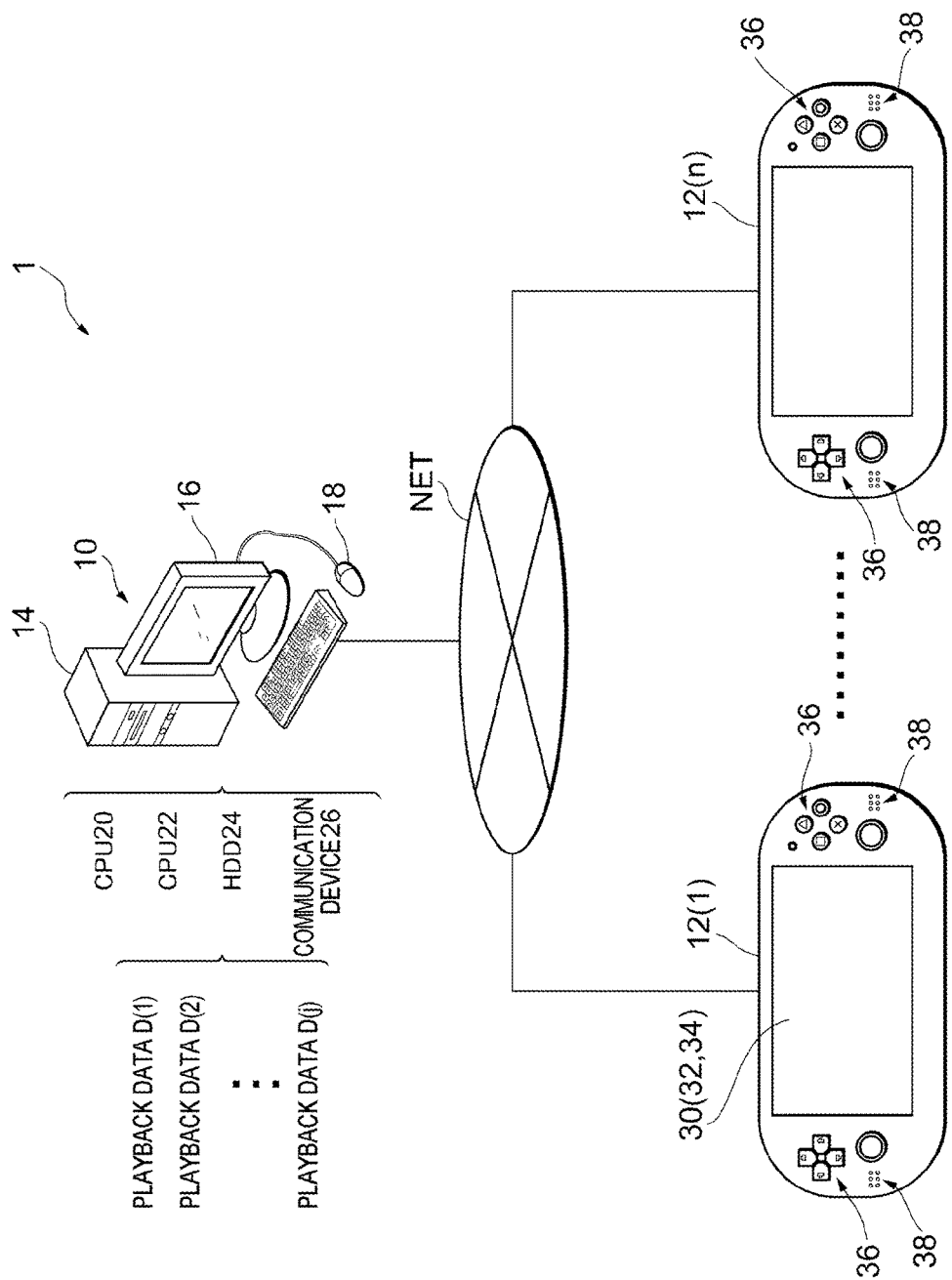
FIG. 1 is a system configuration diagram of an information processing system according to a first embodiment.

FIG. 1 is a system configuration diagram of an information processing system according to a first embodiment.

[System Configuration]

As shown in FIG. 1, an information processing system 1 according to the first embodiment includes a server 10 and at least one game apparatus 12($n$) as an information processing apparatus. Moreover, the bracketed "n" denotes an integer that is equal to or larger than 1 and a value thereof is not particularly limited. The server 10 and the game apparatus 12($n$) are connected so as to be capable of mutually communicating with each other by the Internet NET as a network.

The server 10 is a terminal which collects and distributes playback data D(i) of a game playing video that recreates a game previously played on the game apparatus 12($n$). The server 10 includes a server main body 14, a display apparatus 16, and an input device 18. Moreover, the bracketed "i" denotes an integer that is equal to or larger than 1 and a value thereof is not particularly limited. In addition, the playback data D(i) is video data or key operation data used in order to play back the game playing video. Video data refers to digital data representing video or audio and is data compressed in a prescribed format (for example, the MPEG format). In the case of video data, video or audio is played back by expanding compressed data and restoring image data or audio data of an video. Key operation data refers to data including data storing operation data of operating buttons 36 (to be described later) that were operated during the game along a time series of game play and data which accompanies the operation data and which is related to play contents of the game (for example, a used character and a played game mode). In the case of key operation data, video or audio similar to that during game play is played back by recreating the game play using operation timings of the operating buttons 36 by a player under same play conditions such as a used character and a used game mode. In addition to video data and operation data, playback data D(i) may include, for example, at least one of battle date and time, a player name, number of opponents, a selected character, a selected style, various global settings, battle contents, a style at start, and user information at the time of battle.

The server main body 14 includes hardware such as a CPU (central processing unit) 20, a memory 22, an HDD (hard disk drive) 24, and a communication device 26, an operating system (not shown) and a program (not shown) that realizes the collection and distribution functions described above which are stored in the HDD 24, and i-number of pieces of collected playback data D(i). The display apparatus 16 is a display such as a liquid crystal display or an organic EL (electro-luminescence) display. The input device 18 is, for example, a keyboard or a mouse.

On the other hand, while a type of the game apparatus 12(n) is not particularly limited, for example, the game apparatus 12(n) is a portable terminal with an appearance such as that shown in FIG. 1. Specifically, the game apparatus 12(n) according to the first embodiment adopts a case 28 with a super-oval shape and is designed in a size that enables a player to easily grasp the game apparatus 12(n) with both hands. Although not illustrated, the case 28 internally houses a computing device (a control circuit) 40 which comprehensively controls the game apparatus 12(n) (refer to FIG. 2).

The game apparatus 12(n) includes a touch screen 30 (a touch panel) arranged in an approximately central portion of an upper surface of the case 28. The touch screen 30 displays an image (for example, a still image, an video, or video) which expresses or produces a game and accepts input due to a touch operation by the player. The touch screen 30 is typically an apparatus including display and input functions in which a transparent touch sensor 34 is arranged on a display (screen) 32, and known apparatuses can be used as the touch screen 30. While the touch screen 30 according to the first embodiment is an organic EL display designed to accommodate multi-touch input, the touch screen 30 is not limited thereto.

A plurality of operating buttons 36 are arranged at both left and right end portions of the case 28 or, in other words, at left and right positions to which thumbs of the player come into contact when holding the case with both hands. In the first embodiment, directional buttons and circular buttons are arranged on both left and right sides of the case 28. The operating buttons 36 are to be used in place of, or to complement, user input via the touch screen 30. In addition, audio output units 38 are respectively arranged in the vicinity of the sets of left and right operating buttons. The audio output units 38 are for providing the player with sound (for example, music, voices, and sound effects) for expressing or producing a game.

[Hardware Configuration]

Figure 2:
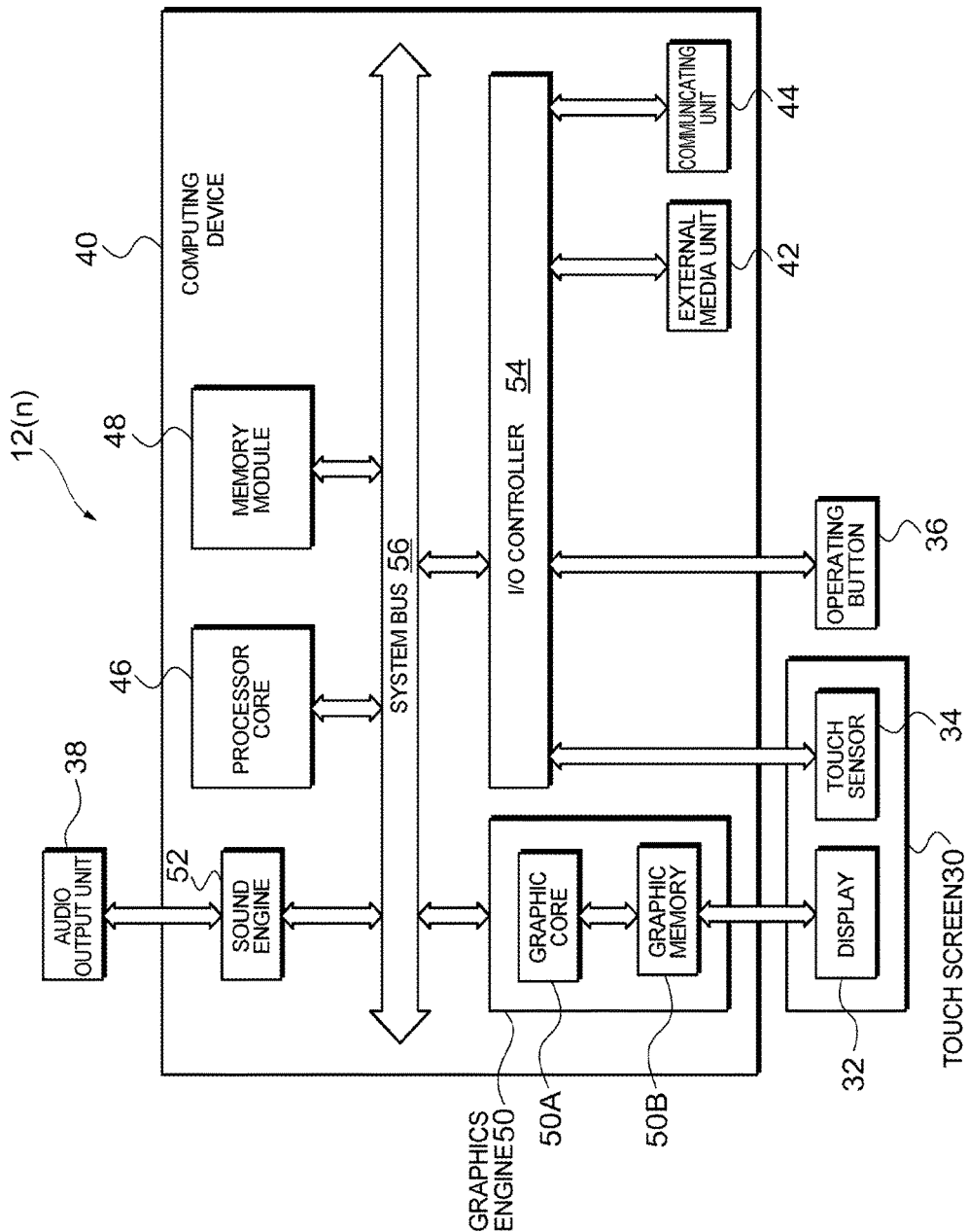
FIG. 2 is a block diagram showing an example of a general hardware configuration of a game apparatus shown in FIG. 1.

Next, a hardware configuration of the game apparatus 12(n) will be described. FIG. 2 is a block diagram showing an example of a general hardware configuration of the game apparatus 12(n) shown in FIG. 1.

In addition to the touch screen 30, the operating buttons 36, and the audio output units 38 described above, for example, the game apparatus 12(n) includes the computing device 40 which comprehensively controls the game apparatus 12(n), an external media unit 42 for accessing an external storage medium, and a communicating unit 44 for performing wireless network communication with the server 10 or other game apparatuses 12(n).

The computing device 40 is, for example, a computer circuit element which includes a chip set and which is made up of various processors, memories, and the like. For example, the computing device 40 according to the first embodiment includes a processor core 46, a memory module 48, a graphics engine 50, a sound engine 52, an I/O controller 54, and a system bus 56 which connects these components. In addition, the computing device 40 may include a media engine for processing videos at high speed. Furthermore, the computing device 40 may include an HDD (hard disk drive) for increasing storage capacity.

The processor core 46 is a chip that functions as a main processor of the computing device. In this case, the term "processor core" can be considered synonymous to terms such as "processor", "CPU (central processing unit)", and "MPU (microprocessor unit)" which refer to a main processor. The processor core 46 executes a game program deployed on the memory module 48 to realize various functions of the computing device 40. In other words, by executing the game program under the control of the processor core 46, the computing device 40 cooperates with other hardware units/components to realize a game on the game apparatus 12(n). The game program may be executed under the control of, for example, an operating system (OS) which is realized under the control of the processor core 46. In addition, video data among the playback data D(i) may be generated (compressed) or played back (expanded) by a software codec operated by the processor core 46. Both single-core and multi-core processors can be adopted as the processor core 46. The processor core 46 includes multi-level data caches (not shown). In addition, the processor core 46 may be configured so that a floating-point processor (FPU), a vector floating point processor (VFPU), or the like (not shown) are connected thereto, in which case a game program is executed in cooperation by the processor core 46 and the floating-point processor (FPU), the vector floating point processor (VFPU), or the like.

Moreover, while a type of the game realized on the game apparatus 12(n) is not particularly limited, the game may be a puzzle game, a racing game, a mahjong game, a battle game such as a combat game (including cooperative games), or a single-player game such as a shooting game, an adventure game, and an action roll-playing game. In the first embodiment, a description will be given on the premise that the game is, for example, a battle game.

The memory module 48 stores various programs and data necessary for executing the game. The memory module 48 is constituted by any of, or an appropriate combination of, a volatile memory represented by a DRAM (dynamic random access memory), a non-rewritable non-volatile memory represented by a masked ROM (read only memory), and a rewritable non-volatile memory represented by a flash memory. The volatile memory is typically used as a main memory of the processor core 46 and, for example, stores a part of or all of game programs and game data as necessary. The non-volatile memory stores, for example, a BIOS, an OS program, device drivers, system data necessary for controlling the game apparatus 12(n), user data, graphic data, and data related to play results. The non-volatile memory may be entirely constituted by a flash memory without adopting a masked ROM. In addition, the entire memory module 48 may be constituted by a rewritable non-volatile memory such as a flash memory. An external storage medium mounted to a memory card slot of the game apparatus 12(*n*) may also be used as a part of the memory module 48.

The graphics engine 50 performs various graphic processes under the control of the processor core 46. The graphics engine 50 is typically configured so as to include a graphic core 50A and a graphic memory 50B. The graphic core 50A may also be referred to as a video display processor (VDP) or a graphic processing unit (GPU). The graphic core 50A reads out graphic data stored in the graphic memory 50B and performs various graphic processes (for example, a geometric process, a rendering process, and a texture mapping process) to generate image data. Image data generated by the graphic core 50A is converted into a prescribed video signal by a video interface circuit (not shown) and output to the touch screen 30.

Under the control of the processor core 46, the sound engine 52 performs various sound processes (for example, an effect process and a mixing process) as appropriate on sound data stored in a sound memory (not shown). Sound data processed by the sound engine 52 is converted into a prescribed audio signal by a sound interface circuit (not shown) and output to the audio output units 38. Moreover, video data among the playback data D(i) is generated from sound data processed by the sound engine 52 and image data generated by the graphic core 50A.

The I/O controller 54 is an interface circuit for controlling input and output to and from various external units. In the present embodiment, the touch sensor 34, the operating buttons 36, the external media unit 42, and the communicating unit 44 are connected to the I/O controller 54. The I/O controller 54 converts external signals supplied from the various connected units to internal data in the computing device 40 and converts internal data into external signals suitable for the various units.

The touch screen 30 includes the display 32 and the touch sensor 34 as described above and is capable of displaying game images and accepting interactive touch operations by the player under the control of the computing device 40. The display 32 displays an image (for example, a still image, an video, or video) on the display 32 based on a video signal from the graphics engine 50. The display 32 may be a 3D display. The touch sensor 34 outputs an operation signal in accordance with a touch operation by the player. The touch operation by the player may be performed by the player's fingers or by a stylus or the like. For example, while a capacitance touch sensor may be adopted as the touch sensor 34, the touch sensor 34 is not limited thereto.

An operation signal output from the touch sensor 34 is input to the computing device 40, and upon detecting the operation signal from the touch sensor 34, the computing device 40 interprets the operation signal as an operation with respect to the game and executes processes in accordance with the interpretation. For example, the computing device 40 calculates positional information on the display 32 based on the operation signal from the touch sensor 34, in which case the positional information is used together with a game image and time information in order to determine an operation action. The game apparatus 12(*n*) according to the present embodiment is configured so as to be capable of accepting multi-touch operations made by a plurality of fingers (or a stylus).

While the operating buttons 36 are typically constituted by a plurality of buttons (keys), the operating buttons 36 are not limited thereto. In the first embodiment, sets of left and right operating buttons constituted by directional buttons and circular buttons are respectively provided.

The audio output units 38 provide the player with a game sound (for example, a voice, music, and a sound effect) based on an audio signal from the sound engine 52 in accordance with the progress of the game.

The external media unit 42 is, for example, a media interface device for accessing an external storage medium such as a memory card. Although an example of the external storage medium is a memory card, the external storage medium is not particularly limited and may be a CD-ROM, a CD-R, a DVD-ROM, a DVD-R, or the like. For example, the external storage medium is used for supplying a game program according to the present embodiment to the game apparatus 12(*n*) and for saving user data. The external media unit 42 accesses the mounted external storage medium to read out data and, when write is permitted, to write data onto the external storage medium. Moreover, the case 28 of the game apparatus 12(*n*) is provided with a memory card slot to enable mounting and detaching of the external storage medium.

The communicating unit 44 is a communicating board used by the game apparatus 12(*n*) to communicate with the server 10 or other game apparatuses. For example, a circuit that realizes a communication standard such as wireless LAN (local area network), Bluetooth (registered trademark), or 3G is mounted. Although a communication mode according to the first embodiment is premised on wireless communication, wired communication such as a wired LAN is not excluded.

[Functional Configuration]

Figure 3:
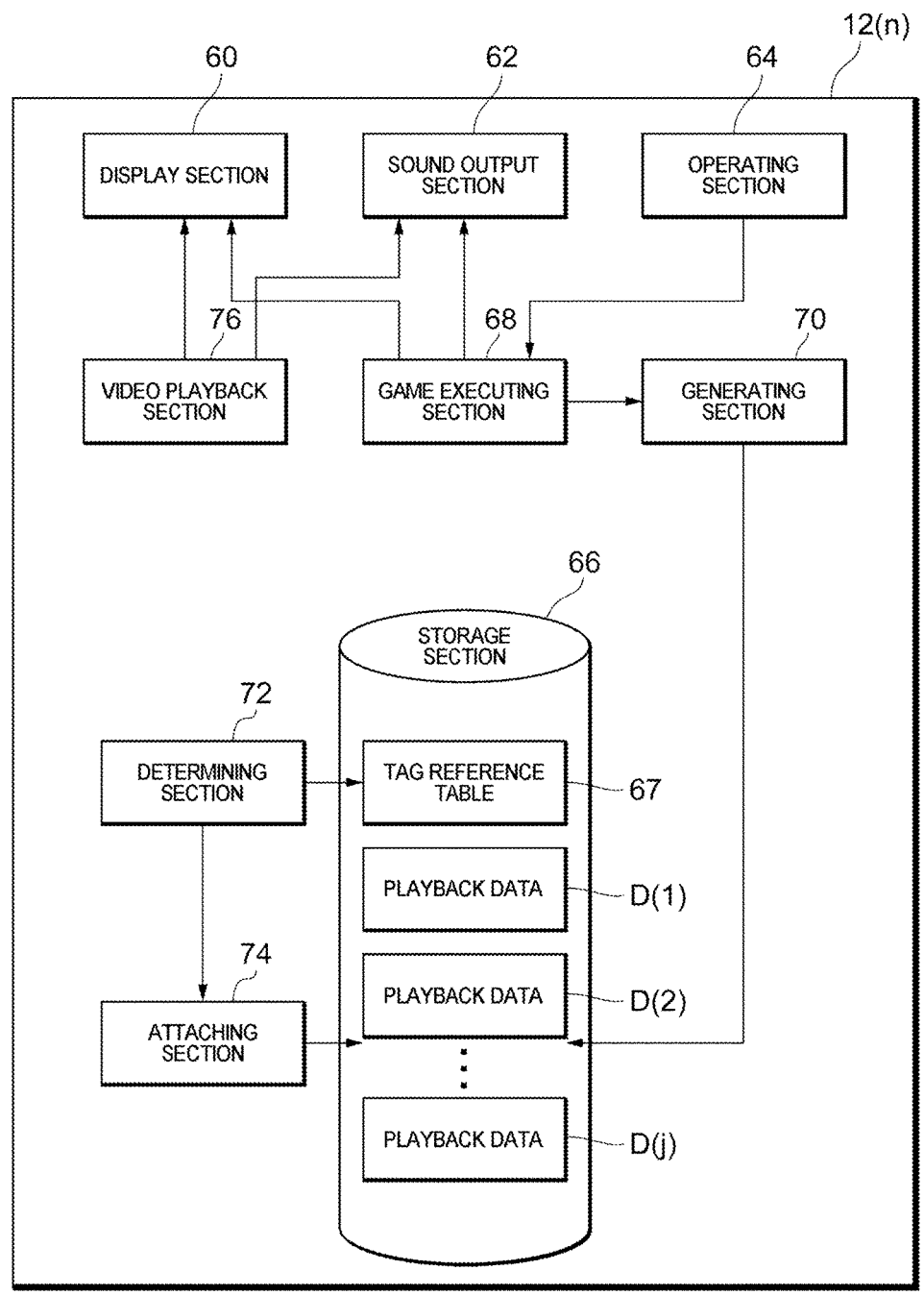
FIG. 3 is a block diagram showing an example of a functional configuration of the game apparatus shown in FIG. 1.

Next, a functional configuration of the game apparatus 12(*n*) will be described. FIG. 3 is a block diagram showing an example of a functional configuration of the game apparatus 12(*n*) shown in FIG. 1.

As shown in FIG. 3, the game apparatus 12(*n*) includes a display section 60, a sound output section 62, an operating section 64, and a storage section 66.

The display section 60 is, for example, the display 32. The sound output section 62 is configured so as to include, for example, the audio output units 38 and the sound engine 52. The operating section 64 is configured so as to include, for example, the operating buttons 36 and the touch sensor 34. The storage section 66 is, for example, the memory module 48. A tag reference table 67 is stored in advance in the storage section 66. In addition, j-number of pieces of playback data D(j) are stored as appropriate in the storage section 66 by user operations. Moreover, j denotes an integer that is equal to or larger than 1 and a value thereof is not particularly limited.

Figure 4:
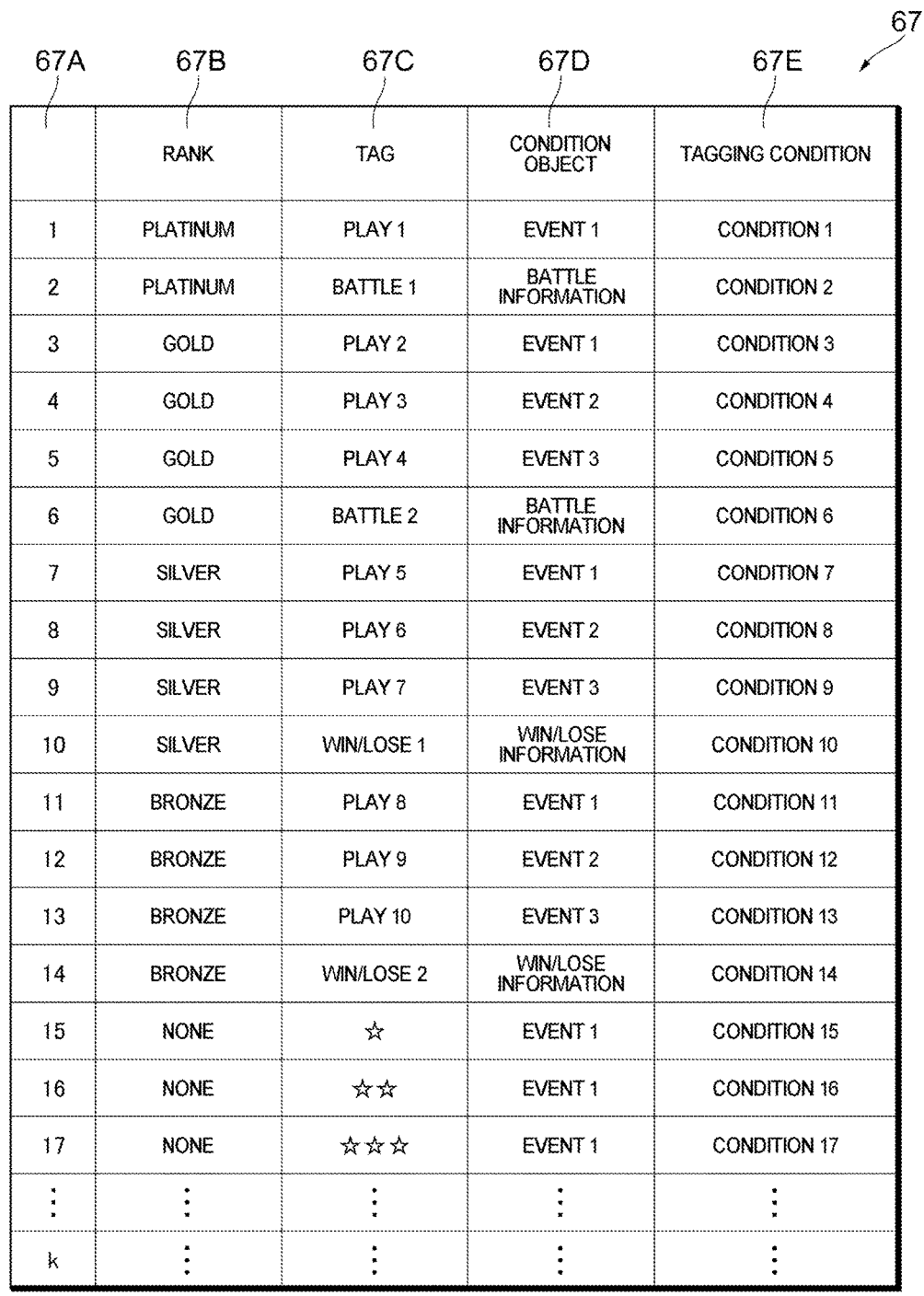
FIG. 4 is an explanatory diagram of a tag reference table.

FIG. 4 is an explanatory diagram of the tag reference table 67. In the tag reference table 67, for example, serial numbers 67A are assigned in a single vertical row. The number m of the serial numbers 67A is an integer that is equal to or larger than 1 and a value thereof is not particularly limited.

A rank 67B, a tag 67C, a condition object 67D, and a tagging condition 67E are stored in association with each other in a single horizontal row of each serial number 67A.

The rank 67B indicates a difficulty level of fulfilling the tagging condition 67E of the associated tag 67C. While names of types of the rank 67B are not particularly limited, examples include "platinum", "gold", "silver", "bronze", and "none" as shown in FIG. 4.

The tag 67C is information which may be attached to playback data D(j) as will be described later. In the first embodiment, the tag 67C functions as an index when a user selects a game playing video (playback data D(j)). As the tag 67C, FIG. 4 shows various types of tags indicating information such as "play 1", "play 2", "play 3", . . . , "battle 1", "battle 2", . . . , "win 1", "win 2", . . . , and "1 star", "2 stars", . . . . While specific names such as "play 1", "play 2", and "play 3" are not particularly limited, for example, names such as "Godlike gameplay", "ultra play", and "super play" are used to facilitate comparisons with other game plays in terms of how impressive a game play is. While specific names such as "battle 1" and "battle 2" are also not particularly limited, for example, names such as "summit showdown" and "championship" are used. While specific names such as "win 1" and "win 2" are also not particularly limited, for example, names such as "dramatic comeback win" and "comeback win" are used.

The condition object 67D indicates contents of the game that is an object of determination of the corresponding tagging condition 67E. Alternatively, the condition object 67D may be omitted and included in the tagging condition 67E.

Examples of the "game contents" include an event during the play of a game.

An event during the play of a game refers to, for example, an event taking place up to just before a winner is decided when the game is a battle game and an event taking place up to just before a stage is cleared in the case of a shooting game, an adventure game, or a role-playing game. The event includes at least one of an action (play) by the player and an action (play) by an opponent in a battle game. Therefore, play 1, play 2, and the like of the tag 67C represent names of an action of the player or an action of the opponent. In addition, for example, the event may include a change in weather, the creation of a quest, or a concert or a campaign taking place. As such an event, FIG. 4 shows a plurality of types of events including "event 1", "event 2", . . . .

Furthermore, in addition to events, examples of game contents include battle information and win/loss information. Battle information refers to information related to the player or the opponent including a national or local ranking, an attribute, and compatibility, or information related to battle including game difficulty and game environment. As such battle information, FIG. 4 shows a plurality of types of battle information including "battle information 1", "battle information 2", . . . .

Win/loss information refers to information describing, for example, how a win/loss was decided. As such win/loss information, FIG. 4 shows a plurality of types of win/loss information including "win/loss information 1", "win/loss information 2", . . . .

The tagging condition 67E is a condition for the determining section 72 to determine whether or not to attach the corresponding tag 67C based on the corresponding condition object 67D. As the tagging condition 67E, FIG. 4 shows a plurality of types of tagging conditions 67E including "condition 1", "condition 2", "condition 3", . . . .

When the tag 67C is a type of "play" and the condition object 67D is a type of "event", examples of the tagging condition 67E include whether chains caused by an action of the player or an action of the opponent are 10 chains or more, 11 chains or more, or 13 chains or more.

In this case, "chains" refer to a phenomenon in which blocks consecutively disappear as a result of the blocks being erased and stacks of the blocks being rearranged as follows.

Specifically, when a prescribed condition is satisfied by a pile of accumulated blocks (or characters) such as when three blocks with a same shape are connected vertically, horizontally, or diagonally, the connected blocks disappear. Blocks having accumulated on the disappeared blocks drop below. As the blocks drop, when three blocks with a same shape are connected vertically, horizontally, or diagonally, the connected blocks disappear. Subsequently, blocks having accumulated on the disappeared blocks drop below, and as the blocks drop, when three blocks with a same shape are connected vertically, horizontally, or diagonally, the connected blocks disappear. This cycle is repeated until three blocks with a same shape can no longer be connected vertically, horizontally, or diagonally.

In addition, when the tag 67C is a type of "play" and the condition object 67D is a type of "event", examples of the tagging condition 67E include whether successive actions (such as a combo) by the player or the opponent are 10 hit combos or more, 15 hit combos or more, or 20 hit combos or more.

Furthermore, when the tag 67C is a type of "play" and the condition object 67D is a type of "event", examples of the tagging condition 67E include whether play time of the player is 5 minutes or longer, 6 minutes or longer, or 7 minutes or longer.

Moreover, when the tag 67C is a type of "battle" and the condition object 67D is a type of "battle information", examples of the tagging condition 67E include whether the battle is between players with national rankings of 10th or higher, between players with national rankings of 100th or higher, or between players ranked 10th or higher in a given district.

In addition, when the tag 67C is a type of "win/loss" and the condition object 67D is a type of "win/loss information", examples of the tagging condition 67E include whether the player has come back and won from a prescribed clutch situation, whether the player has come back and won from a state where a hit point of the player was lower than that of the opponent, whether the opponent has come back and won from a prescribed clutch situation (the player has lost), or whether the opponent has come back and won from a state where a hit point of the opponent was lower than that of the player (the player has lost).

Furthermore, when the tag 67C is a type of "star" and the condition object 67D is a type of "event", examples of the tagging condition 67E include whether the number of chains is not the same as in the case where the tag 67C is a type of "play" and the condition object 67D is a type of "event" such as 12 chains between 11 and 13 chains, 14 chains, and the like.

In addition to the above, the tagging condition 67E is not particularly limited and various conditions may be adopted as long as the conditions are related to game contents.

Returning to FIG. 3, the game apparatus 12(n) includes a game executing section 68, a generating section 70, a determining section 72, an attaching section 74, and an video playback section 76 which respectively function as the processor core 46 executes a game program.

The game executing section 68 controls at least one of the display section 60 and the sound output section 62 based on operation information of the operating section 64 and executes the game.

The generating section 70 generates playback data D to be used for playing back a game playing video of the game and stores the playback data D in the storage section 66 every time the game is executed by the game executing section 68.

The determining section 72 refers to the tag reference table 67 while the game is being executed by the game executing section 68 and determines whether or not game contents (the condition object 67D) including an event during the play of the game satisfy each tagging condition 67E.

The attaching section 74 attaches the tag 67C to playback data D(j) as an index of a game playing video when the playback data D(j) has been generated and the game contents satisfy the tagging condition 67E or, in other words, when the determining section 72 makes a positive determination. A specific process by the attaching section 74 will be described later.

When a list display request is made, the video playback section 76 causes the display section 60 to display a list of playback data D(j) stored in the storage section 66 and display the tags 67C attached to the playback data D(j). In addition, when a playback request for the playback data D(j) selected using the operating section 64 from the list display is made, the video playback section 76 causes the display section 60 and the sound output section 62 to play back a game playing video based on the selected playback data D(j).

[Processing of Determining Section 72]

Figure 5:
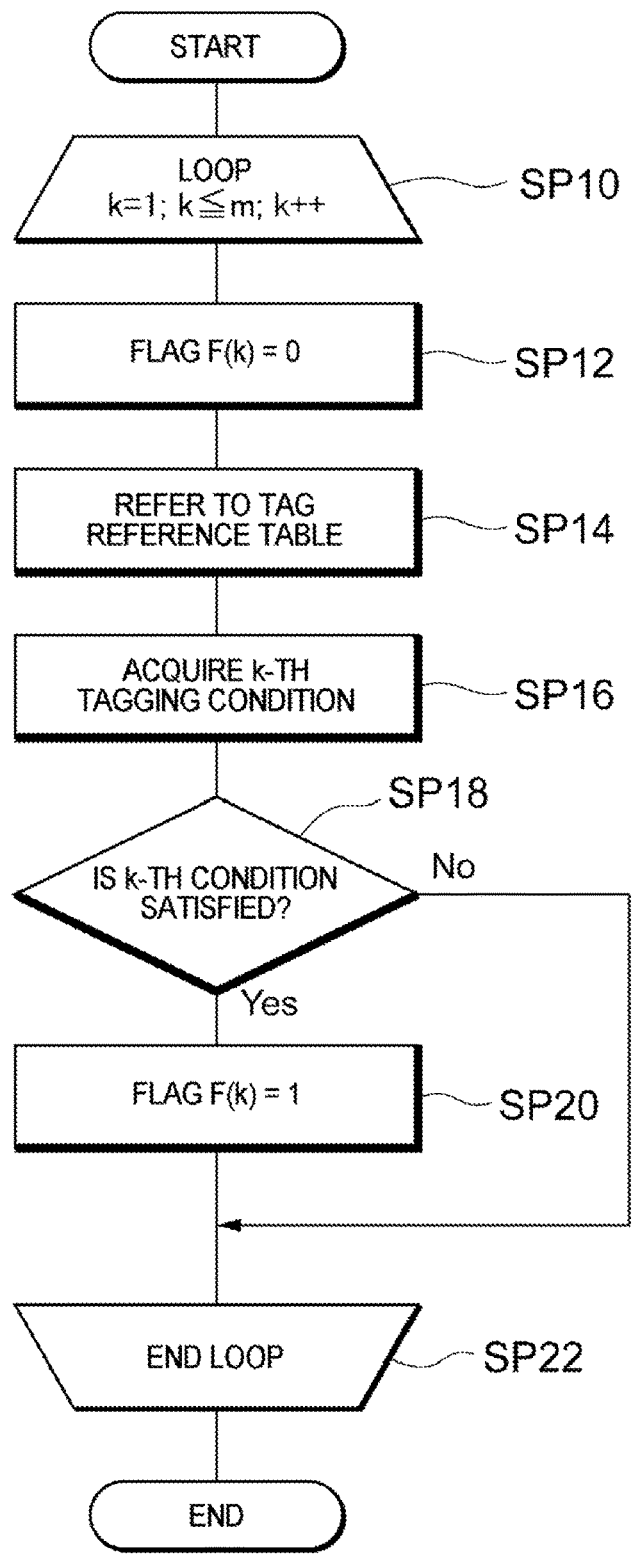
FIG. 5 is a flow chart of processing by a determining section shown in FIG. 3.

Next, processing of the determining section 72 will be described. FIG. 5 is a flow chart of processing by the determining section 72. The processing is repetitively executed either regularly such as every 0.1 seconds or irregularly while the game is being executed by the game executing section 68 (during execution of a main game excluding periods where a menu screen and the like are being displayed). Moreover, in a case of, for example, a battle game, the main game more specifically refers to the game from the moment a battle is started to the moment a winner is decided.

(Steps SP10 and SP22) The determining section 72 repetitively performs processes of steps SP12 to SP20 between steps SP10 and SP22 while incrementing a variable k by "1" (k=k+1) until a value of the variable k reaches a value indicating the number m of the serial numbers 67A starting from 1.

(Step SP12) The determining section 72 assigns "0" to each of m-number of flags F(k) {F(k)=0}. Subsequently, the determining section 72 makes a transition to the process of step SP14.

(Step SP14) The determining section 72 refers to (reads out) the tag reference table 67 in the storage section 66. Subsequently, the determining section 72 makes a transition to the process of step SP16.

(Step SP16) The determining section 72 acquires a tagging condition with a k-th serial number 67A in the tag reference table 67. Subsequently, the determining section 72 makes a transition to the process of step SP18.

(Step SP18) The determining section 72 determines whether or not game contents including an event during the play of the game satisfies the tagging condition with the k-th serial number 67A. The determining section 72 makes a transition to the process of step SP20 when making a positive determination and makes a transition to the process of step SP22 when making a negative determination (adds "1" to k and returns to the process of step SP12 or ends processing).

(Step SP20) The determining section 72 assigns "1" to the flags F(k) (k=k+1). Subsequently, the determining section 72 makes a transition to the process of step SP22.

[Processing of Generating Section 70]

Figure 6:
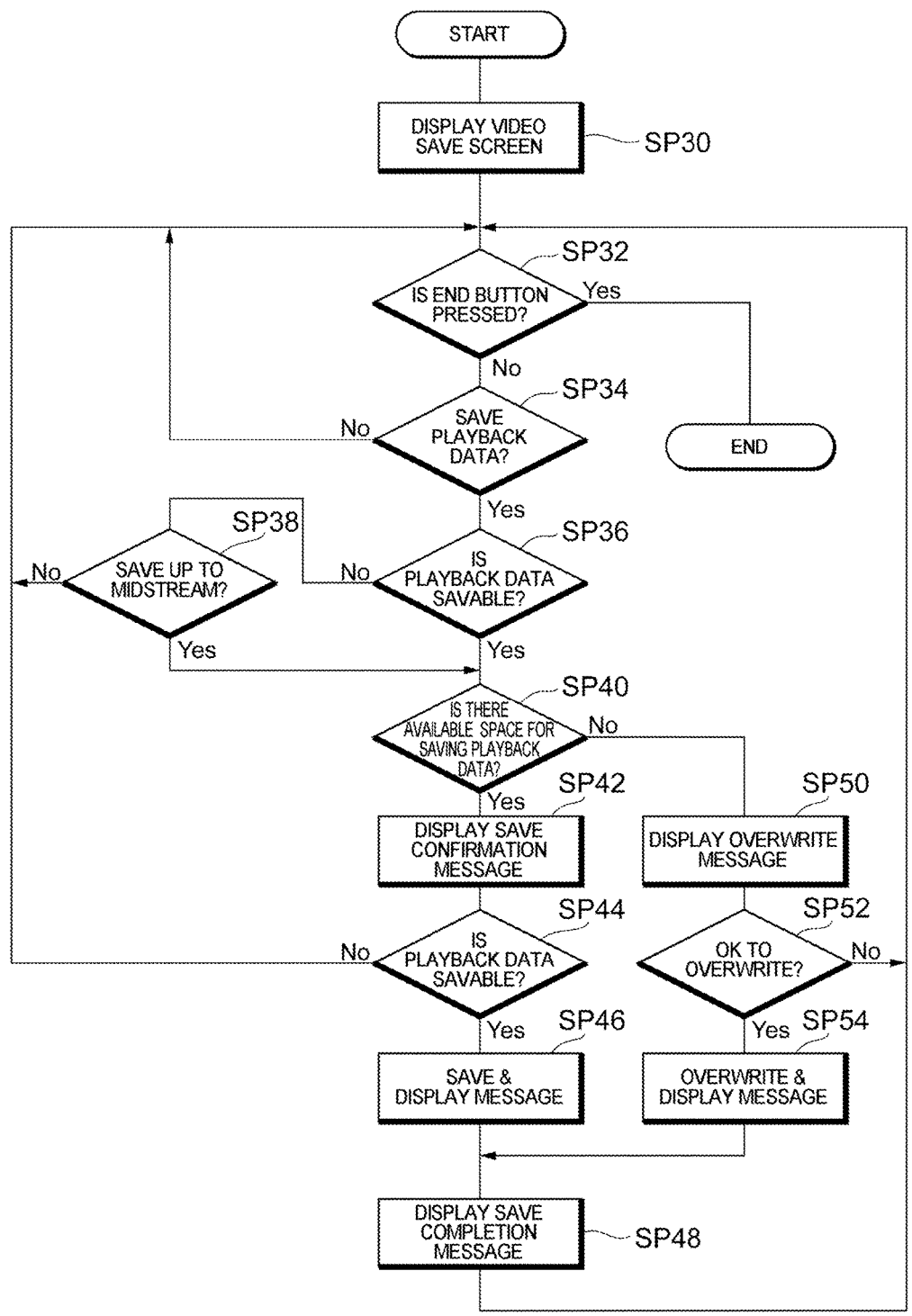
FIG. 6 is a flow chart of processing by a generating section shown in FIG. 3.

Next, processing of the generating section 70 will be described. FIG. 6 is a flow chart of processing by the generating section 70. In addition, the processing is started immediately after execution of the game (immediately after execution of the main game) by the game executing section 68. Furthermore, while the main game is being executed, the generating section 70 generates playback data of the main game as needed and stores (saves) the playback data in the storage section 66 that is a temporary storage memory such as a DRAM or the like.

(Step SP30) The generating section 70 causes the display section 60 to display an video save screen (not shown). Subsequently, the generating section 70 makes a transition to the process of step SP32.

The video save screen is, for example, a result screen that is displayed after the main game is over. Moreover, a result screen refers to a screen displaying whether or not the main game was won or cleared, how many points were scored, and the like. An end button and a save button (to be described later) are arranged on the video save screen that is a result screen or the like.

(Step SP32) The generating section 70 determines whether or not the end button on the video save screen has been pressed. The generating section 70 ends processing when making a positive determination and makes a transition to the process of step SP34 when making a negative determination.

(Step SP34) The generating section 70 determines whether or not the save button on the video save screen has been pressed or, in other words, whether or not the playback data of the main game which is stored in the temporary storage memory (which, once saved, becomes playback data D(j)) is to be saved. The generating section 70 makes a transition to the process of step SP36 when making a positive determination and returns to the process of step SP32 when making a negative determination.

(Step SP36) The generating section 70 determines whether or not playback data can be saved in the storage section 66. The generating section 70 makes a transition to the process of step SP40 when making a positive determination and makes a transition to the process of step SP38 when making a negative determination.

(Step SP38) The generating section 70 causes the display section 60 to display a dialog (not shown) for inquiring whether or not playback data is to be saved midstream and determines whether or not saving the playback data midstream has been specified using the operating section 64. The generating section 70 makes a transition to the process of step SP40 when making a positive determination and returns to the process of step SP32 when making a negative determination.

(Step SP40) The generating section 70 determines whether or not there are slots available for saving playback data (whether or not the number of currently available slots for saving playback data is a maximum number of available slots). The generating section 70 makes a transition to the process of step SP42 when making a positive determination and makes a transition to the process of step SP46 when making a negative determination. Moreover, the maximum number of available slots is appropriately set in accordance with storage capacity of the storage section 66 and is set to, for example, 10.

(Step SP42) The generating section 70 causes the display section 60 to display a save confirmation message so as to overlap with the video save screen. The save confirmation message is, for example, "Replay will be saved. Proceed? Yes No". Subsequently, the generating section 70 makes a transition to the process of step SP44. Moreover, the term "replay" in the save confirmation message is synonymous with "playback data".

(Step SP44) The generating section 70 makes a transition to the process of step SP46 when "Yes" in the save confirmation message described above is selected and returns to the process of step SP32 when "No" in the save confirmation message is selected.

(Step SP46) The generating section 70 saves the playback data stored in the temporary storage memory in the storage section 66 (for example, a storage apparatus with a larger capacity than the temporary storage memory) as a piece of playback data D(j) of the storage section 66 and erases the playback data in the temporary storage memory. Moreover, when a positive determination had been made in step SP38, data up to midstream of the playback data stored in the temporary storage memory is saved in the storage section 66 as a piece of playback data D(j) of the storage section 66. In addition, during saving, the generating section 70 causes the display section 60 to display a message to the effect that saving is in progress. This message is, for example, "Replay is being saved. Please wait a while". After saving, the generating section 70 makes a transition to the process of step SP48.

(Step SP48) The generating section 70 causes the display section 60 to display a save completion message together with the number of currently available slots for saving playback data and the maximum number of available slots. The save confirmation message is, for example, "Replay has been saved. 9/10". Moreover, "9" in the save confirmation message represents the number of currently available slots for saving playback data and "10" in the save confirmation message represents the maximum number of available slots. Subsequently, the generating section 70 returns to the process of step SP32.

(Step SP50) The generating section 70 causes the display section 60 to display an overwrite message so as to overlap with the video save screen. The overwrite message is, for example, "No slots are available for saving replay. Oldest replay will be overwritten. Proceed? Yes No". Subsequently, the generating section 70 makes a transition to the process of step SP52.

(Step SP52) The generating section 70 makes a transition to the process of step SP54 when "Yes" in the overwrite message described above is selected and returns to the process of step SP32 when "No" in the overwrite message is selected.

(Step SP54) The generating section 70 overwrites an oldest piece of playback data D(j) stored in the storage section 66 with the playback data stored in the temporary storage memory and erases the playback data in the temporary storage memory. In addition, during saving, the generating section 70 causes the display section 60 to display a message to the effect that overwriting is in progress. This message is, for example, "Replay is being overwritten. Please wait a while". After overwriting, the generating section 70 makes a transition to the process of step SP48.

[Processing of Attaching Section 74]

Figure 7:
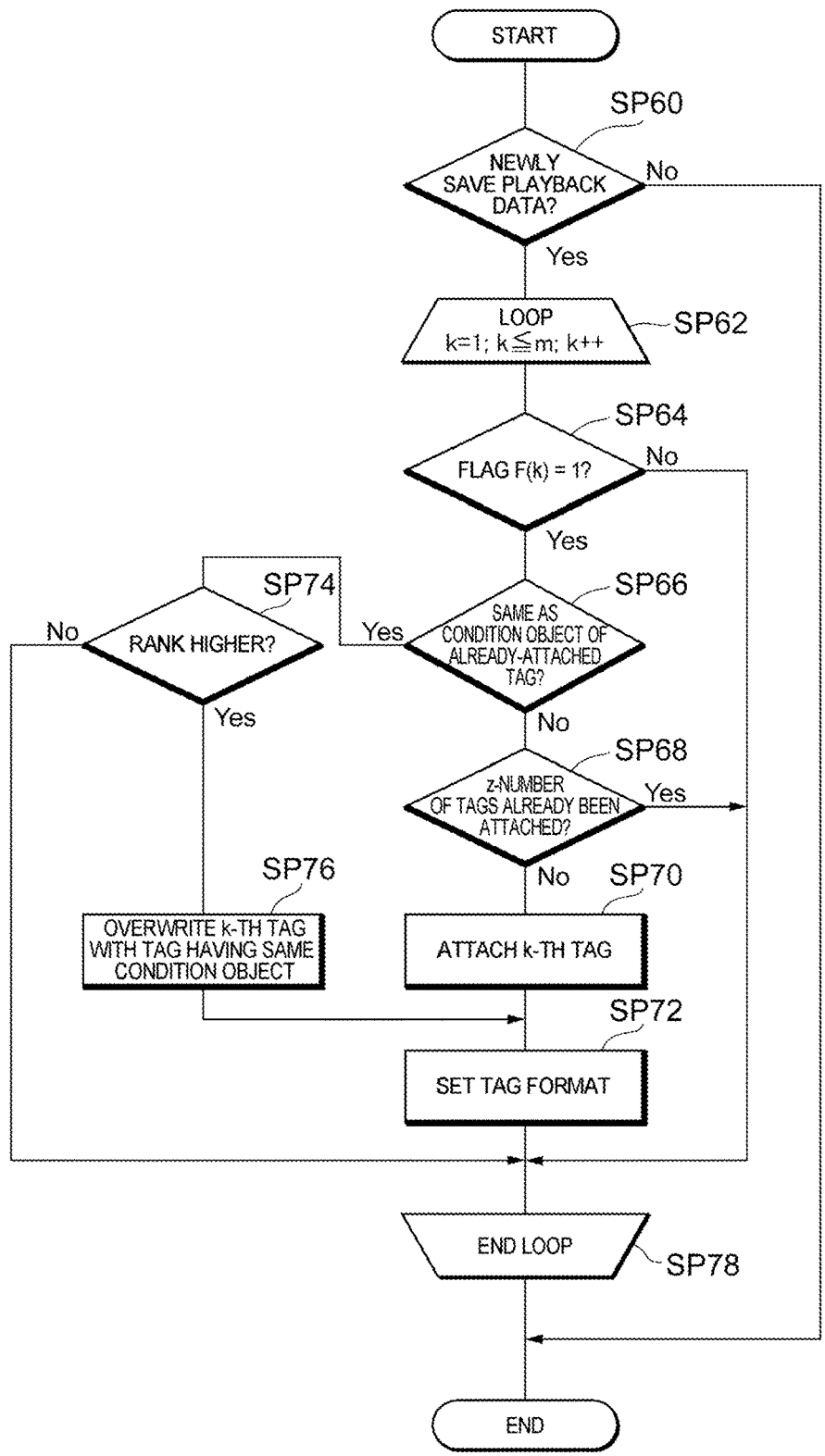
FIG. 7 is a flow chart of processing by an attaching section shown in FIG. 3.

Next, processing of the attaching section 74 will be described. FIG. 7 is a flow chart of processing by the attaching section 74. The processing is repetitively executed either regularly such as every 0.1 seconds or irregularly while, for example, the video save screen is being displayed.

(Step SP60) The attaching section 74 determines whether or not playback data D(j) has been newly saved (generated) in the storage section 66. The attaching section 74 makes a transition to the process of step SP62 when making a positive determination and ends the processing when making a negative determination.

(Steps SP62 and SP78) The attaching section 74 repetitively performs processes of steps SP64 to SP78 between steps SP62 and SP78 while incrementing a variable k by "1" (k=k+1) until a value of the variable k reaches a value indicating the number m of the serial numbers 67A starting from 1.

(Step SP64) The attaching section 74 determines whether or not a flag F(k)=1 or, in other words, whether or not the tagging condition 67E associated with a "k"-th serial number 67A is satisfied. The attaching section 74 makes a transition to the process of step SP66 when making a positive determination and makes a transition to the process of step SP78 when making a negative determination (adds "1" to k and returns to the process of step SP64 or ends processing).

(Step SP66) The attaching section 74 refers to the tag reference table 67 and determines whether or not the condition object 67D associated with the "k"-th serial number 67A is the same as the condition object 67D of the tag 67C already attached in step SP70 (to be described later). Subsequently, the attaching section 74 makes a transition to the process of step SP72 when making a positive determination and makes a transition to the process of step SP68 when making a negative determination.

(Step SP68) The attaching section 74 determines whether or not z-number of tags 67C have already been attached. Moreover, "z" denotes an integer that is equal to or larger than 1 and, while a value thereof is not particularly limited, an example thereof is 2. Subsequently, the attaching section 74 makes a transition to the process of step SP78 when making a positive determination and makes a transition to the process of step SP70 when making a negative determination.

(Step SP70) The attaching section 74 refers to the tag reference table 67 and attaches the tag 67C associated with the "k"-th serial number 67A to playback data D(j) having been newly saved as an index of a game playing video. Subsequently, the attaching section 74 makes a transition to the process of step SP72.

(Step SP72) The attaching section 74 sets a format of the tag 67C attached in step SP70 in accordance with a difficulty level of satisfying the tagging condition 67E of the tag 67C or, in other words, in accordance with the rank 67B associated with the tag 67C. Subsequently, the attaching section 74 makes a transition to the process of step SP78.

Examples of setting the format include setting a color so that the higher the difficulty, the more prominent the color tone for higher visibility and setting a font size or choosing an italic or bold setting so that the higher the difficulty, the greater the degree of visual enhancement. Moreover, when a rank 67B is not associated with the tag 67C, the attaching section 74 uses a default format setting.

(Step SP74) The attaching section 74 refers to the tag reference table 67 and determines whether or not the rank 67B associated with the "k"-th serial number 67A is higher than the rank 67B of the tag 67C already attached in step SP70. Subsequently, the attaching section 74 makes a transition to the process of step SP76 when making a positive determination and makes a transition to the process of step SP78 when making a negative determination.

(Step SP76) The attaching section 74 overwrites the tag 67C which has already been attached and which is associated with the same condition object 67D as the condition object 67D associated with the "k"-th serial number 67A with the tag 67C associated with the "k"-th serial number 67A. In other words, the tag 67C associated with the "k"-th serial number 67A is attached to the playback data D(j) and the already-attached tag 67C is erased. Subsequently, the attaching section 74 makes a transition to the process of step SP72.

[Bidirectional Processing of Game Apparatus 12(*n*) and Server 10]

Figure 8:
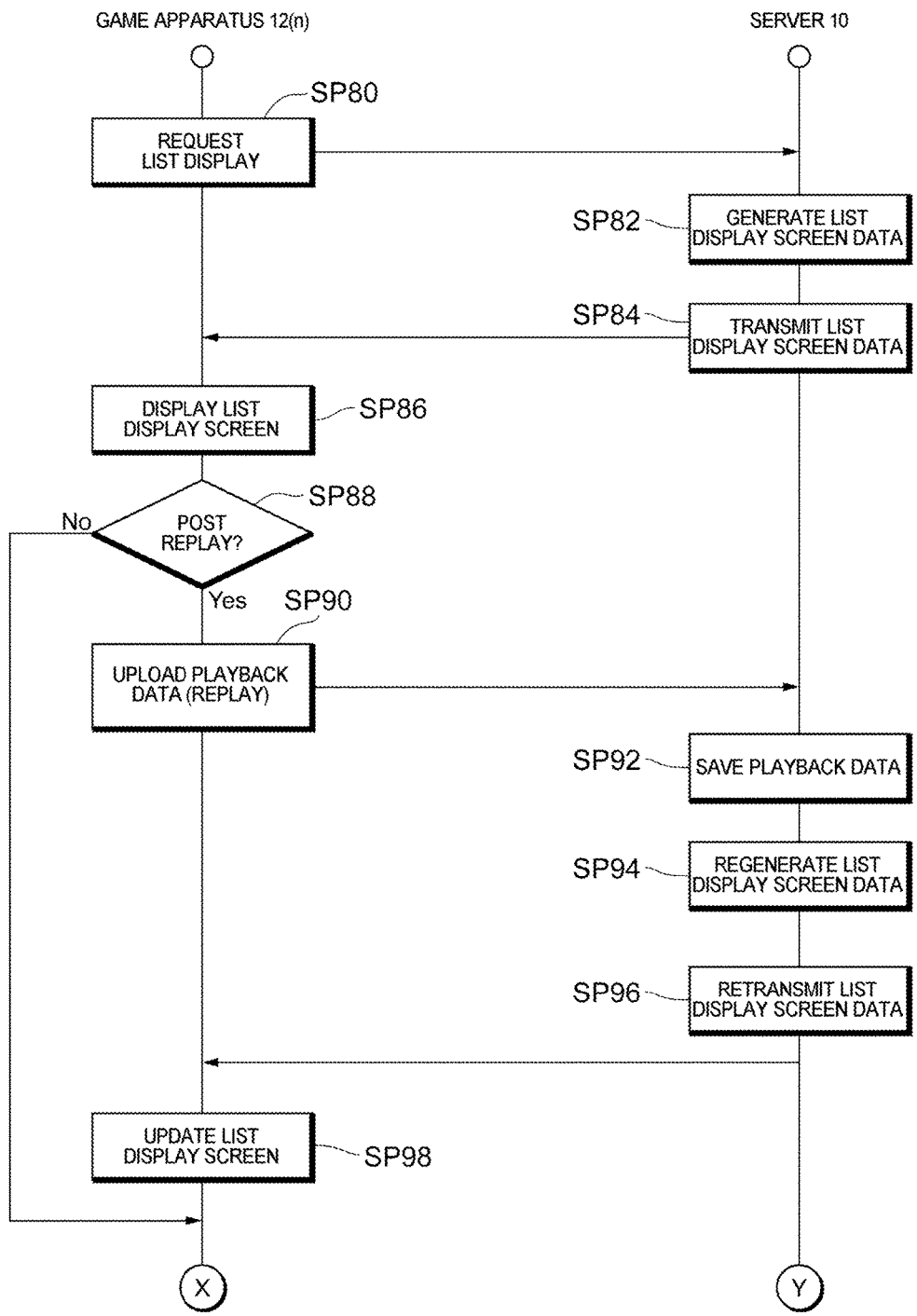
FIG. 8 is a flow chart of bidirectional processing by a game apparatus and a server.
Figure 9:
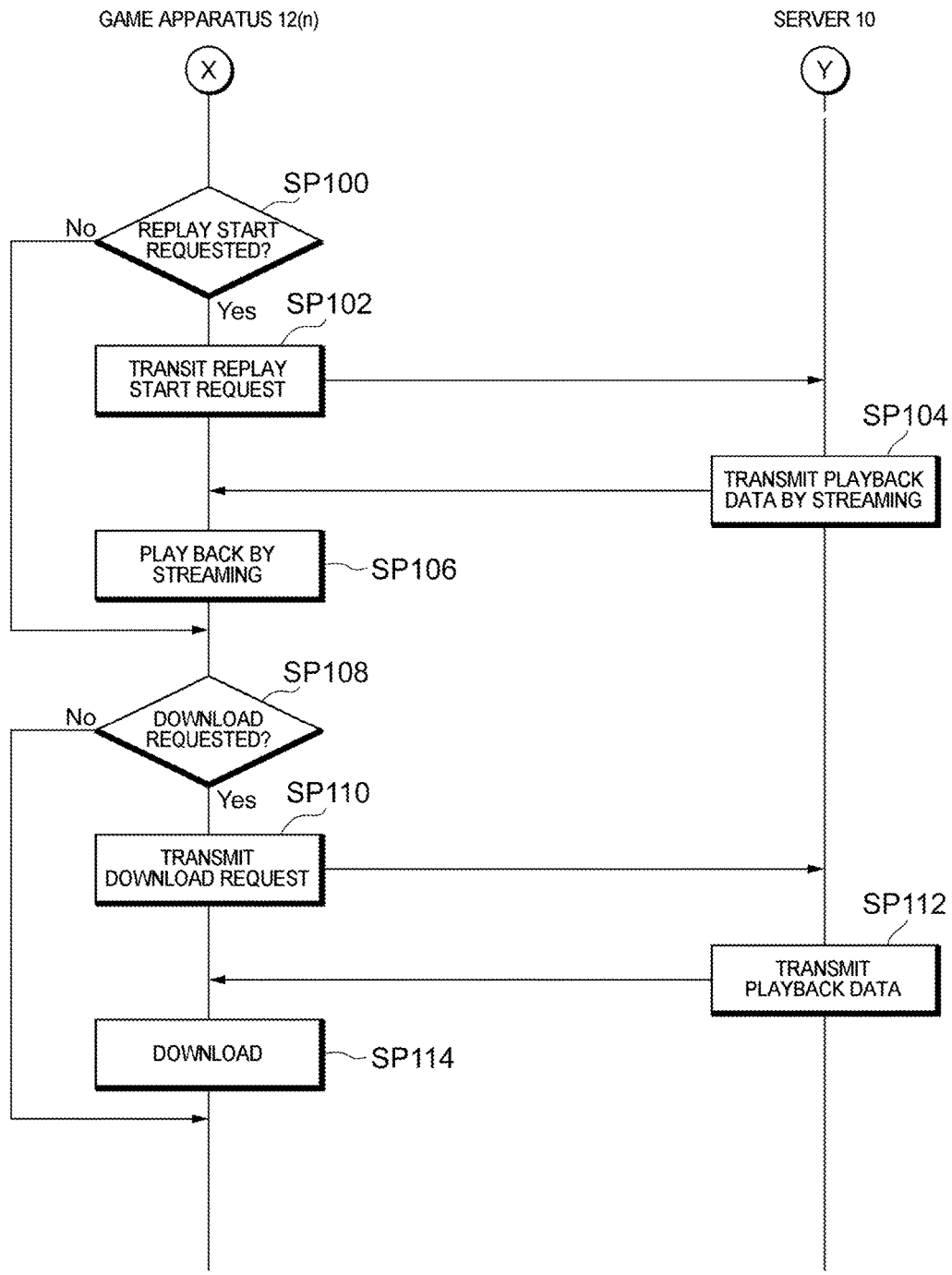
FIG. 9 is a flow chart of processing that is a continuation of the bidirectional processing shown in FIG. 8.

Next, bidirectional processing of the game apparatus 12(*n*) and the server 10 shown in FIG. 1 will be described. FIGS. 8 and 9 are flow charts of bidirectional processing by the game apparatus 12(*n*) and the server 10.

(Step SP80) When a list display request is made by an operation of the operating section 64 on a screen of a game menu, a screen of a website of a game company, or the like, each game apparatus 12(*n*) transmits the list display request to the server 10 via the communicating unit 44 and the Internet NET.

(Step SP82) When the communication device 26 of the server 10 receives a list display request from any of game apparatuses (n), the server 10 generates list display screen data based on all playback data D(i) and all attached tags 67C in the HDD 24. Subsequently, the server 10 makes a transition to the process of step SP84.

(Step SP84) The server 10 transmits the generated list display screen data to the game apparatus 12(*n*) having transmitted the list display request.

(Step SP86) The game apparatus 12(*n*) having transmitted the list display request receives the list display screen data from the server 10 via the Internet NET and the communicating unit 44. Subsequently, based on the list display screen data, the game apparatus 12(*n*) causes the display section 60 to display a list display screen 80 such as that shown in FIG. 10.

A left-hand side of the list display screen 80 displays, for example, a list of bars 82 indicating names of players having posted each piece of playback data D(i) (replay). The bar 82 may include attribute information 84 and the tag 67C describing a relationship between a player named on the bar 82 and the player of the game apparatus 12(*n*) having transmitted the list display request, a rank of the player in national rankings, or the like. In addition, when any one of the bars 82 is selected using the operating section 64, a detail field 86 of the playback data D(i) corresponding to the selected bar 82 is displayed on, for example, a right-hand side of the list display screen 80. The detail field 86 displays the tag 67C attached to the playback data D(i) as an index of a game playing video {or playback data D(i) thereof}. In addition, the detail field 86 may display characters 88 used by the player and the opponent during a battle, battle date and time 90, or the like.

Furthermore, an explanation of a process corresponding to each operating button 36 is displayed on a lower side of the list display screen 80.

(Step SP88) The game apparatus 12(*n*) determines whether or not the operating button 36 corresponding to a process for posting a replay has been pressed. The game apparatus 12(*n*) makes a transition to the process of step SP90 when making a positive determination and makes a transition to the process of step SP100 when making a negative determination. Moreover, the processes of step SP88 and thereafter are repetitively performed while the list display screen 80 is being displayed.

(Step SP90) The game apparatus 12(*n*) uploads the replay. In other words, the game apparatus 12(*n*) transmits the playback data D(j) in the storage section 66 to the server 10 via the communicating unit 44 and the Internet NET. In this case, the playback data D(j) may be a single piece of playback data D(j) selected using the operating section 64 or all of the pieces of playback data D(j) in the storage section 66.

(Step SP92) Upon receiving the playback data D(j) from the game apparatus 12(*n*), the server 10 saves the playback data D(j) as one of the pieces of playback data D(i) in the HDD 24. Subsequently, the server 10 makes a transition to the process of step SP94.

(Step SP94) The server 10 regenerates list display screen data based on all playback data D(i) and all attached tags 67C in the HDD 24. Subsequently, the server 10 makes a transition to the process of step SP96.

(Step SP96) The server 10 retransmits the generated list display screen data to the game apparatus 12(*n*) having uploaded the replay.

(Step SP98) The game apparatus 12(*n*) having uploaded the replay receives the list display screen data from the server 10 via the Internet NET and the communicating unit 44. Subsequently, based on the list display screen data, the game apparatus 12(*n*) updates the list display screen 80. In other words, the game apparatus 12(*n*) causes the display section 60 to display the list display screen 80 reflecting the upload.

Figure 10:
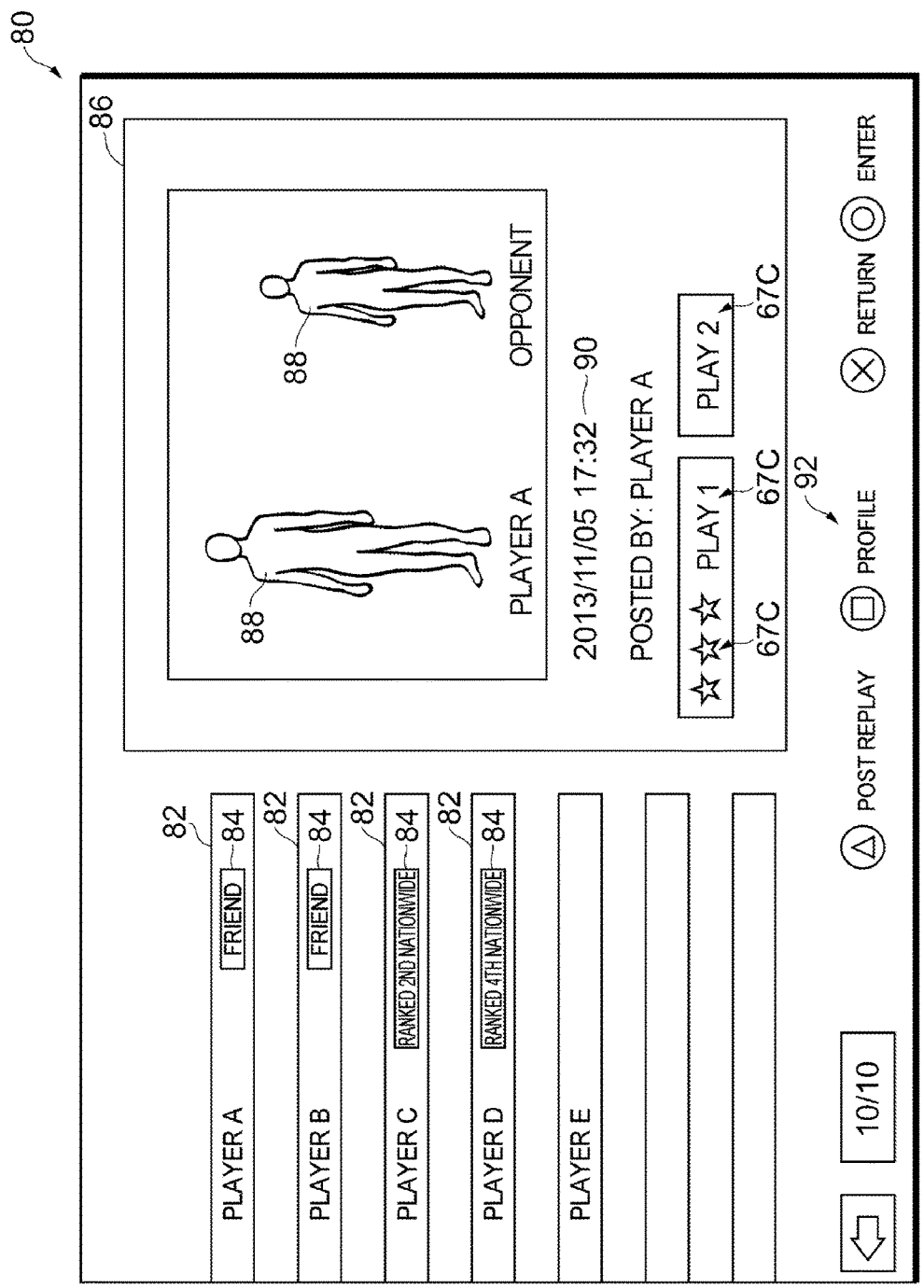
FIG. 10 is an explanatory diagram of an example of a list display screen that is displayed on a display section of the game apparatus shown in FIG. 1.

(Step SP100) The game apparatus 12(*n*) determines whether or not a replay start request has been made by an operation using the operating section 64. The game apparatus 12(*n*) makes a transition to the process of step SP102 when making a positive determination and makes a transition to the process of step SP108 when making a negative determination. Moreover, a replay start request occurs when, for example, a replay start button (not shown) in the detail field 86 on the right-hand side of the list display screen 80 shown in FIG. 10 is pressed using the operating section 64.

(Step SP102) The game apparatus 12(*n*) transmits the replay start request or, in other words, a start request of a game playing video based on the playback data D(i) corresponding to details displayed in the detail field 86 to the server 10 via the communicating unit 44 and the Internet NET.

(Step SP104) Upon receiving the replay start request from the game apparatus 12(*n*), the server 10 transmits, by streaming, the corresponding playback data D(i) in the HDD 24 to the game apparatus 12(*n*).

(Step SP106) Upon receiving the playback data D(i) from the server 10 when appropriate, the game apparatus 12(*n*) plays back a game playing video by streaming based on the playback data D(i) using the video playback section 76.

(Step SP108) The game apparatus 12(*n*) determines whether or not a download request has been made by an operation using the operating section 64. Subsequently, the game apparatus 12(*n*) makes a transition to the process of step SP110 when making a positive determination and returns to the process of step SP88 when making a negative determination as long as the list display screen 80 is being displayed. Moreover, a download request occurs when, for example, a download button (not shown) in the detail field 86 on the right-hand side of the list display screen 80 shown in FIG. 10 is pressed using the operating section 64 or when pausing during playback by streaming.

(Step SP110) The game apparatus 12(*n*) transmits the download request or, more specifically, a download request for the playback data D(i) corresponding to details displayed in the detail field 86 to the server 10 via the communicating unit 44 and the Internet NET.

(Step SP112) Upon receiving the download request from the game apparatus 12(n), the server 10 transmits the corresponding playback data D(i) in the HDD 24 to the game apparatus 12(n).

(Step SP114) Upon receiving the playback data D(i) from the server 10, the game apparatus 12(n) saves the playback data D(i) as one of the pieces of playback data D(j) in the storage section 66 through similar processes as those shown in FIG. 6. However, before saving, a determination is made by referring to the storage section 66 on whether or not same playback data D(j) has already been saved, and the playback data D(i) is saved when a positive determination is made but the playback data D(i) is not saved when a negative determination is made. Subsequently, the game apparatus 12(n) returns to the process of step SP88 as long as the list display screen 80 is being displayed.

Effect

As described above, according to the first embodiment of the present invention, the game apparatus 12(n) includes the attaching section 74 which attaches the tag 67C to playback data D(j) as an index of a game playing video when the playback data D(j) has been generated by the generating section 70 and an event during the play of a game as the condition object 67D satisfies the tagging condition 67E (refer to steps SP62 to SP78 shown in FIG. 7).

Therefore, the tag 67C is to be displayed as an index of a game playing video when selecting a game playing video {or playback data D(j)} on the list display screen 80 shown in FIG. 10 or the like. As a result, a player or the like can retrieve and select a desired game playing video while viewing a displayed list of game playing videos (in the first embodiment, names of posters having posted game playing videos) using the tag 67C as a mark. In other words, according to the first embodiment of the present invention, retrieval performance when selecting a game playing video can be improved.

In a similar manner, when an event satisfies a prescribed tagging condition 67E among a plurality of tagging conditions 67E, the attaching section 74 attaches the tag 67C associated with the prescribed tagging condition 67E to playback data D(j) as an index and, when game contents of a type other than an event satisfies another tagging condition 67E among the plurality of tagging conditions 67E, the attaching section 74 attaches the tag 67C associated with the other tagging condition 67E to the playback data D(j) as an index. As a result, a player or the like can retrieve and select a desired game playing video by viewing a displayed list of game playing videos while distinguishing the type of the tag 67C.

Furthermore, when contents of a plurality of types of games all satisfy respectively corresponding types of tagging conditions 67E, the attaching section 74 combines types of tags 67C associated with each tagging condition 67E as an index of a game playing video and attaches the combined tags 67C to the playback data (j) (refer to steps SP62 to SP78 shown in FIG. 7). Therefore, according to the first embodiment of the present invention, game playing videos can be more readily distinguished from each other and retrieval performance when selecting a game playing video can be further improved.

Moreover, since the attaching section 74 sets a format of the attached tag 67C in accordance with a difficulty level of achieving the tagging condition 67E of the tag 67C, according to the first embodiment of the present invention, game playing videos can be more readily distinguished from each other.

In addition, since an event as the condition object 67D includes at least one of successive actions of a player and successive actions of an opponent, even when characteristics of a game playing video cannot be sufficiently expressed by a thumbnail image, the characteristics of the game playing video can be sufficiently expressed and retrieval performance when selecting a game playing video can be further improved.

Second Embodiment

Next, an information processing apparatus according to a second embodiment of the present invention will be described. While a case where the attaching section 74 attaches the tag 67C after a main game is over and after playback data D(j) is saved in the storage section 66 has been described in the first embodiment, the second embodiment significantly differs from the first embodiment in that the attaching section 74 attaches the tag 67C during the play of a main game.

A configuration of the information processing apparatus according to the second embodiment is similar to the configuration of the game apparatus 12(n) according to the first embodiment. However, the information processing apparatus according to the second embodiment includes an upload button (for example, the share button of PlayStation 4) which enables a game playing video {playback data D(j)} up to midstream of a game to be uploaded to a server connected to the Internet NET including the server 10 during the play of the game. Moreover, in addition to the server 10, examples of servers include a server of a communication tool such as Twitter (registered trademark) and a server of a social networking service such as Facebook (registered trademark).

When the upload button is pressed during the play of a game, the information processing apparatus uploads, to the server, playback data D(j) up to midstream of the game stored in a temporary storage memory such as playback data D(j) between 15 seconds prior to the upload button being pressed and the moment the upload button had been pressed. Prior to the upload, when the game contents satisfy the tagging condition 67E, the attaching section 74 of the information processing apparatus attaches the tag 67C to playback data D(j) that is an upload object as an index of a game playing video.

As described above, according to the second embodiment of the present invention, since the tag 67C is attached to playback data D(j) during the play of a game, for example, an uploaded game playing video can be immediately retrieved in real-time using the tag 67C as a mark and conversation with the game as a topic can be facilitated on a communication tool or the like.

Third Embodiment

Next, an information processing apparatus according to a third embodiment of the present invention will be described. While a case where an information processing apparatus including the attaching section 74 is the game apparatus 12(n) has been described in the first embodiment, the third embodiment significantly differs from the first embodiment in that an information processing apparatus including the attaching section 74 is a server.

A configuration of the information processing apparatus according to the third embodiment is similar to the configuration of the server 10 but the information processing apparatus also includes the attaching section 74 and the tag reference table 67. On the other hand, while a game apparatus is configured in a similar manner to the game apparatus 12(n), the game apparatus need not include the attaching section 74.

For example, when an operating button 36 for posting a replay is pressed or the like, the game apparatus according to the third embodiment transmits a flag F(k) indicating whether or not game contents satisfy the tagging condition 67E together with playback data D(j) to which the tag 67C has not been attached to the server as an information processing apparatus via the communicating unit 44 and the Internet NET. In addition, upon receiving playback data D(j) to which the tag 67C has not been attached from the game apparatus, the attaching section 74 of the server according to the third embodiment refers to the tag reference table 67 and attaches the tag 67C to the playback data D(j) in accordance with the game contents satisfying the tagging condition 67E.

As described above, according to the third embodiment of the present invention, by providing a single server with the attaching section 74, the attaching section 74 need no longer be provided in each of a plurality of game apparatuses. As a result, processing loads on the game apparatuses can be reduced. From this perspective, the determining section 72 may also be provided in the server instead of in the game apparatuses. In this case, since it is difficult for the determining section 72 to determine whether or not the tagging condition 67E is satisfied when a game is actually being executed at a game apparatus, for example, playback is automatically performed one time when receiving playback data D(j) from a game apparatus and the determining section 72 makes the determination while the playback is in progress.

Modifications

While a plurality of embodiments of the techniques disclosed by the present application have been described, the techniques disclosed by the present application are not limited to those described above.

For example, while a case where the tag reference table 67 is stored in advance in the storage section 66 has been described, a player may independently create the tag reference table 67 and store the tag reference table 67 in the storage section 66.

In addition, while a case where the game apparatus 12(n) includes the communicating unit 44 has been described, the game apparatus 12(n) need not include the communicating unit 44. In this case, playback data D(j) attached with the tag 67C may be saved in a portable storage medium, the portable storage medium may be mailed to a company possessing the server 10, and the playback data D(j) may be saved in the HDD 24 of the server 10 from the portable storage medium by an employee of the company.

Furthermore, while only up to z-number of tags 67C can be attached in steps SP68 and SP70 shown in FIG. 7, step SP68 may be omitted and a necessary number of tags 67C may be attached as long as the tagging condition 67E is satisfied. In addition, when only attaching up to z-number of tags 67C, a priority of attaching the tags 67C may be set in the tag reference table 67.

Moreover, the game apparatus 12(n) or the server 10 may include a processing section which processes playback data D(j) and a time-measuring section which measures elapsed time from start of a game in order to enable, when playing back a game playing video, a game playing video to be played back from immediately prior to an event having caused the tag 67C to be attached. When an event occurs, the processing section raises a flag immediately prior to the occurrence of the event, receives information on elapsed time from the start of the game at the point where the flag was raised, and associates the flag and the elapsed time information with the playback data D(j). By playing back a game playing video from the point where the flag was raised when playing back the game playing video, a viewer of the game playing video can view an video from immediately prior to the event. In addition, "processing" includes cases where the playback data D(j) is deleted as appropriate.

REFERENCE SIGNS LIST

1 Information processing system
10 Server (information processing apparatus, server)
12 Game apparatus (information processing apparatus)
64 Operating section
66 Storage section
67B Rank (difficulty level)
67C Tag
67D Condition object (game contents, event during the play of a game)
67E Tagging condition
68 Game executing section (executing section)
70 Generating section
74 Attaching section
76 Video playback section (playback section)
D Playback data

What is claimed is:

1. An information processing apparatus comprising:
a storage section in which at least one tag and a tagging condition of the tag are stored in association with each other;
a determining section which determines whether or not an event during play of a game satisfies a tagging condition; and
an attaching section which, when playback data to be used to play back a game playing video of the game has been generated and an event during the play of the game satisfies the tagging condition, attaches the tag, which is associated with the tagging condition, to the playback data as an index of the game playing video,
wherein
the tagging condition includes, a first tagging condition of the event and a second tagging condition of game contents of a type other than the event, and
the attaching section attaches a first tag, which is associated with the first tagging condition, to the playback data as the index when the event satisfies the first tagging condition, and attaches a second tag, which is associated with the second tagging condition, to the playback data as the index when the event satisfies the second tagging condition.

2. The information processing apparatus according to claim 1, wherein
when a plurality of tagging conditions are all satisfied, the attaching section combines tags associated with respective tagging conditions as the index and attaches the combined tags to the playback data.

3. An information processing apparatus comprising:
a storage section in which at least one tag and a tagging condition of the tag are stored in association with each other;

a determining section which determines whether or not an event during play of a game satisfies a tagging condition; and an attaching section which, when playback data to be used to play back a game playing video of the game has been generated and an event during the play of the game satisfies the tagging condition, attaches the tag, which is associated with the tagging condition, to the playback data as an index of the game playing video, wherein when a plurality of tagging conditions are all satisfied, the attaching section combines tags associated with respective tagging conditions as the index and attaches the combined tags to the playback data.

4. An information processing apparatus comprising:

a storage section in which at least one tag and a tagging condition of the tag are stored in association with each other;

a determining section which determines whether or not an event during play of a game satisfies a tagging condition; and an attaching section which, when playback data to be used to play back a game playing video of the game has been generated and an event during the play of the game satisfies the tagging condition, attaches the tag, which is associated with the tagging condition, to the playback data as an index of the game playing video, wherein the attaching section sets a format of the tag to be attached, in accordance with a difficulty level of achieving the tagging condition of the tag.

5. An information processing apparatus comprising:

a storage section in which at least one tag and a tagging condition of the tag are stored in association with each other;

a determining section which determines whether or not an event during play of a game satisfies a tagging condition;

an attaching section which, when playback data to be used to play back a game playing video of the game has been generated and an event during the play of the game satisfies the tagging condition, attaches the tag, which is associated with the tagging condition, to the playback data as an index of the game playing video; and a processing section which processes the playback data so that, when playing back the game playing video, the game playing video can be played back just prior to the event that has caused the tag to be attached.

6. An information processing system comprising:

a server; and at least one information processing apparatus which is capable of communicating with the server, wherein the information processing apparatus comprises:

a storage section in which at least one tag and a tagging condition of the tag are stored in association with each other;

a determining section which determines whether or not an event during play of a game satisfies a tagging condition;

an attaching section which, when playback data to be used to play back a game playing video of the game has been generated and an event during the play of the game satisfies the tagging condition, attaches the tag, which is associated with the tagging condition, to the playback data as an index of the game playing video;

an operating section;

an executing section which executes the game, based on operation information of the operating section;

a generating section which generates the playback data to be used for playing back a game playing video of the game when the game is executed by the executing section; and a playback section which plays back the game playing video, based on the playback data generated by the generating section, wherein the information processing apparatus transmits playback data selected, using the operating section, among the playback data to the server, and the server causes the at least one information processing apparatus to display a list of received playback data and display the tag attached to the received playback data, wherein, when a transmission request for playback data selected, using the operating section, from the displayed list is made from the at least one information processing apparatus, the server transmits the selected playback data to the information processing apparatus having made the transmission request.

* * * * *